(12) United States Patent
Du et al.

(10) Patent No.: US 10,237,083 B2
(45) Date of Patent: Mar. 19, 2019

(54) RBRIDGE FOR ROUTING AND FORWARDING A DATA PACKET

(71) Applicant: International Business Machines Corporation, Armonk, NY (US)

(72) Inventors: Kai Hong Du, Shanghai (CN); Heng Guo Ge, Wuxi (CN); Fu Hui Li, Wuxi (CN); Jiu Xing Nie, Shanghai (CN); Da Shen, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 14/826,654

(22) Filed: Aug. 14, 2015

(65) Prior Publication Data

US 2016/0065445 A1 Mar. 3, 2016

(30) Foreign Application Priority Data

Aug. 29, 2014 (CN) .......................... 2014 1 0437970

(51) Int. Cl.
*H04L 12/18* (2006.01)
*H04L 29/12* (2006.01)
(Continued)

(52) U.S. Cl.
CPC .......... *H04L 12/1886* (2013.01); *H04L 45/66* (2013.01)

(58) Field of Classification Search
CPC ..... H04L 12/751; H04L 12/18; H04L 12/733; H04L 12/741; H04L 29/12; H04L 12/1886; H04L 45/66
(Continued)

(56) References Cited

U.S. PATENT DOCUMENTS

| 2004/0215817 A1 | 10/2004 | Qing et al. |
| 2010/0165995 A1 | 7/2010 | Mehta et al. |
| 2011/0019678 A1 | 1/2011 | Mehta et al. |

FOREIGN PATENT DOCUMENTS

| CN | 1523819 A | 8/2004 |
| CN | 101483595 A | 7/2009 |

(Continued)

OTHER PUBLICATIONS

Zhang et al. ("RBridge Aggregation draft-zhang-trill-aggregation-02.txt", Internet Draft, Intended Status: Proposed Standard, May 2, 2012, Mingui Zhang, Donald Eastlake, Huawei).*
(Continued)

*Primary Examiner* — Melvin C Marcelo
*Assistant Examiner* — Natali Pascual Peguero
(74) *Attorney, Agent, or Firm* — Maeve M. Carpenter; Arnold B. Bangali

(57) ABSTRACT

In an approach to routing and forwarding a data packet with a forwarding RBridge and a corresponding RBridge, a computer, in response to receiving a TRILL data packet, performs the following steps: parsing a TRILL header of the TRILL data packet, and acquiring an egress RBridge nickname of the TRILL data packet; obtaining routing information corresponding to the egress RBridge nickname, wherein the information indicates whether the forwarding RBridge is the penultimate hop RBridge on the forwarding path to which the egress RBridge nickname is corresponding; and in response to the indication in the information that the forwarding RBridge is the penultimate hop RBridge on the forwarding path to which the egress RBridge nickname is corresponding, stripping the TRILL header of the TRILL data packet off to obtain an original data packet, and forwarding the original data packet to the egress RBridge from an out port specified by the information.

16 Claims, 4 Drawing Sheets

(51) Int. Cl.
*H04L 12/733* (2013.01)
*H04L 12/741* (2013.01)
*H04L 12/751* (2013.01)
*H04L 12/721* (2013.01)

(58) Field of Classification Search
USPC .............. 370/254, 389, 392, 401, 466, 467
See application file for complete search history.

(56) References Cited

FOREIGN PATENT DOCUMENTS

| | | |
|---|---|---|
| CN | 101510845 A | 8/2009 |
| CN | 102185782 A | 9/2011 |
| CN | 103391250 A | 11/2013 |
| CN | 105450528 A | 3/2016 |
| EP | 2226973 B1 | 11/2011 |
| WO | 2012171462 A1 | 12/2012 |

OTHER PUBLICATIONS

Zhang, "RBridge Aggregation draft-zhang-trill-aggregation", ID HTML, Oct. 31, 2011, printed: Jun. 3, 2015, pp. 1-12, <http://133.40.3.100/html/draft-zhang-trill-aggregation-01>.

Chinese Patent Application No. 201410437970.8, "RBridge for Routing and Forwarding a Data Packet", filed: Aug. 29, 2014, 23 pages.

* cited by examiner

RBRIDGE FOR ROUTING AND FORWARDING A DATA PACKET

BACKGROUND OF THE INVENTION

The present invention relates to a communication network, and more specifically, to a method for routing and forwarding a data packet with a forwarding RBridge and the corresponding forwarding RBridge.

The transparent interconnection of lots of links (TRILL) is a routing protocol based on a link state algorithm, and a TRILL network consists of routing bridges (RBridges) with a routing and forwarding characteristic, each RBridge acquiring an entire network topology by executing an extended intermediate system to intermediate system (IS-IS) routing protocol, and calculating a routing by means of shortest path first (SPF) algorithm.

FIG. 2 shows a schematic structure of a TRILL network. According to FIG. 2, data packets are transmitted from a host Host-A to a host Host-B over the TRILL network, and pass through three RBridges, of which the nicknames are marked as RB1, RB2 and RB3, respectively. Here, the nickname is a hexadecimal number in 16 bits for identifying one RBridge, and the nicknames of different RBridges are different with each other.

In FIG. 2, the basic communication procedure of each RBridge, i.e. RB1, RB2 and RB3, includes: (1) executing the extended IS-IS routing protocol, establishing a neighborhood relationship with a plurality of adjacent RBridges, exchanging neighborhood information, acquiring the entire network topology finally, and then calculating a routing for the entire network by using the SPF algorithm to generate a nickname routing information base (NRIB) table; (2) generating a nickname forwarding information base (NFIB) table according to the NRIB table; (3) forwarding data packets according to the NFIB table.

Firstly, let's see how each RBridge establishes its own NFIB table in the prior art. After acquiring the network topology with the RBridge acting as the root node itself, each RBridge calculates all paths in which each node is the destination node, constituting the NRIB table. Table 1 below shows a main structure of an existing NRIB table. In following examples, there are provided many specific structures of the table, and in the specific structures only the columns in the table related to the present invention are listed, and other columns that the present invention does not concern or have no relation to the present invention are not listed. Each row in Table 1 is a piece of routing information, and each piece of routing information corresponds to a forwarding path in which the egress RBridge nickname is the destination address. The MAC address of the next hop is obtained according to the egress RBridge nickname parsed from a header of a TRILL data packet, and the TRILL data packet is transmitted to the next hop RBridge through an out port of the TRILL data packet. The main structure of the NFIB table is the same as that of the NRIB table, but in the NRIB table a plurality of paths are direct to the same egress RBridge nickname, and in the NFIB table one optimal path is selected from the plurality of paths in the NRIB, so it can be considered that the NFIB table indicates the routing information extracted from the NRIB table.

TABLE 1

Main Structure of Existing NRIB Table

| Egress RBridge Nickname | Out port of TRILL Data packet | MAC Address for the Next Hop |
| --- | --- | --- |

Next, let's see a forwarding procedure of TRILL data packets. With respect to the RBridge receiving an original data packet, for example, the RB1 shown in FIG. 2, checks a layer two forwarding database (FDB) table firstly, and acquires the result of the Port ID/Nickname column Table 2 shows the FDB table of the RB1 in FIG. 2, in which when the Port ID/Nickname column is the out port of the data packet, it can be determined that it is not necessary for the data to be performed a TRILL package, and a normal layer two forwarding is carried out, however, when the Port ID/Nickname column is the egress RBridge nickname of the data packet, it can be determined that it is necessary for the data packet to be performed a TRILL package. For example, when receiving an original data packet, the RB1 checks Table 2, and determines the egress RBridge is the RB3 according to the destination MAC address of the data packet, which shows that a TRILL package needs to be performed on the data packet. Table 3 shows the existing NFIB table of the RB1. Then, the RB1 checks its own NFIB table for the purpose of the egress RBridge nickname to acquire the out port P2 of the TRILL data packet and the RBridge RB2 for the next hop, and transmits the packaged TRILL data packet to the RB 2 through the P2.

TABLE 2

FDB Table of RB1

| Destination MAC Address of Data Packet | Port ID/Nickname |
| --- | --- |
| Host-A | P1 |
| Host-B | RB3 |

TABLE 3

Existing NFIB Table of RB1

| Egress RBridge Nickname | Out Port of TRILL Data Packet | MAC Address for the Next Hop |
| --- | --- | --- |
| RB2 | P2 | RB2 |
| RB3 | P2 | RB2 |

With respect to the RBridge receiving the TRILL data packet, for example, the RB2 and RB3 shown in FIG. 2 parse the TRILL data packet firstly, acquire the egress RBridge nickname, and then check the NFIB table to determine whether the RBridges are the ultimate hop of the forwarding path themselves. The specific deciding method includes: if the local RBridge has the same nickname as the egress RBridge, then the local RBridge is the ultimate hop on the forwarding path. If it is not the ultimate hop on the forwarding path, the NFIB table is checked by using the egress RBridge nickname to acquire the out port of the TRILL data packet and the next hop RBridge, and the data packet is forwarded to the acquired next hop RBridge through the out port of the TRILL data packet; and if the local RBridge itself is the ultimate hop on the forwarding path, the TRILL header is stripped off, conventional layer two forwarding is performed, and finally the data packet is forwarded to a host. For example, Table 4 shows the existing NFIB table of the RB2 in FIG. 2. The RB2 determines that it is not the ultimate hop on the forwarding path itself after parsing the TRILL data packet received from the RB1, checks Table 4 to obtain the out port P2 of the TRILL data packet and the MAC address for the next hop of the RB3, and then forwards the TRILL data packet to the RB3 through the P2. Table 5 shows the existing NFIB table of the RB3, and Table 6 shows the FDB table of the RB3. The RB3 determines that it is the ultimate hop on the forwarding path itself after parsing the data packet received from the RB2, strips off the TRILL header to acquire the original data packet, and then directly checks Table 6 for the destination MAC address Host-B of the original data packet without checking Table 5 to acquire the PortID as the P2, and transmits the original data packet to the Host-B through the P2.

TABLE 4

Existing NFIB Table of RB2

| Egress RBridge Nickname | Out Port of TRILL Data Packet | MAC Address for the Next Hop |
|---|---|---|
| RB1 | P1 | RB1 |
| RB3 | P2 | RB3 |

TABLE 5

Existing NFIB Table of RB3

| Egress RBridge Nickname | Out Port of TRILL Data Packet | MAC Address for the Next Hop |
|---|---|---|
| RB1 | P1 | RB2 |
| RB2 | P1 | RB2 |

TABLE 6

FDB Table of RB3

| Destination MAC Address of Data Packet | Port ID/Nickname |
|---|---|
| Host-A | RB1 |
| Host-B | P2 |

In the process of the above boundary RBridge (i.e. the ultimate RBridge RB3) performing the TRILL data packet processing, it is necessary to carry out a series of lengthy operations, such as parsing the TRILL data packet header, acquiring the egress RBridge nickname, comparing with the local RBridge nickname, stripping the TRILL header off, checking the FDB table, forwarding the data packet finally, and the like, which consumes many system resources. Since the boundary RBridge is at a particular position, it has a greater system burden originally and performs lengthy operations again, which leads to a performance bottleneck easily.

It has been considered in the prior art that a portion of the job of the boundary RBridge, such as parsing the TRILL packet header, acquiring the egress RBridge nickname, comparing with the local RBridge nickname, stripping the TRILL header off, and so on, is transferred to the penultimate hop RBridge on the forwarding path, however, in the process of forwarding each data packet, each RBridge undergoes a lengthy procedure re-deciding whether the penultimate hop of the forwarding path is itself, which affects the forwarding efficiency.

SUMMARY

According to one aspect of the present invention, there is provided a method for routing and forwarding a data packet with a forwarding RBridge, comprising: in response to receiving a TRILL data packet, performing the following steps: parsing a TRILL header of the TRILL data packet, and acquiring an egress RBridge nickname of the TRILL data packet; obtaining routing information corresponding to the egress RBridge nickname, wherein the routing information indicates whether or not the forwarding RBridge is the penultimate hop RBridge on the forwarding path to which the egress RBridge nickname is corresponding; and in response to the indication in the routing information that the forwarding RBridge is the penultimate hop RBridge on the forwarding path to which the egress RBridge nickname is corresponding, stripping the TRILL header of the TRILL data packet off to obtain an original data packet, and forwarding the original data packet to the egress RBridge from an out port specified by the routing information.

According to another aspect of the present invention, there is provided a forwarding RBridge for routing and forwarding a data packet, comprising: receiving means configured to receive a TRILL data packet; acquiring means configured to, in response to the TRILL data packet received by the receiving means, parse a TRILL header of the received TRILL data packet and acquire an egress RBridge nickname of the TRILL data packet; inquiring means configured to obtain routing information corresponding to the egress RBridge nickname, wherein the routing information indicates whether or not the forwarding RBridge is the penultimate hop RBridge on the forwarding path to which the egress RBridge nickname is corresponding; and first forwarding means configured to, in response to the indication in the routing information that the forwarding RBridge is the penultimate hop RBridge on the forwarding path to which the egress RBridge nickname is corresponding, strip the TRILL header of the TRILL data packet off to obtain an original data packet, and forward the original data packet to the egress RBridge from an out port specified by the routing information.

The method and apparatus provided by the present invention can improve the routing and forwarding efficiency of the RBridge in the TRILL network.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
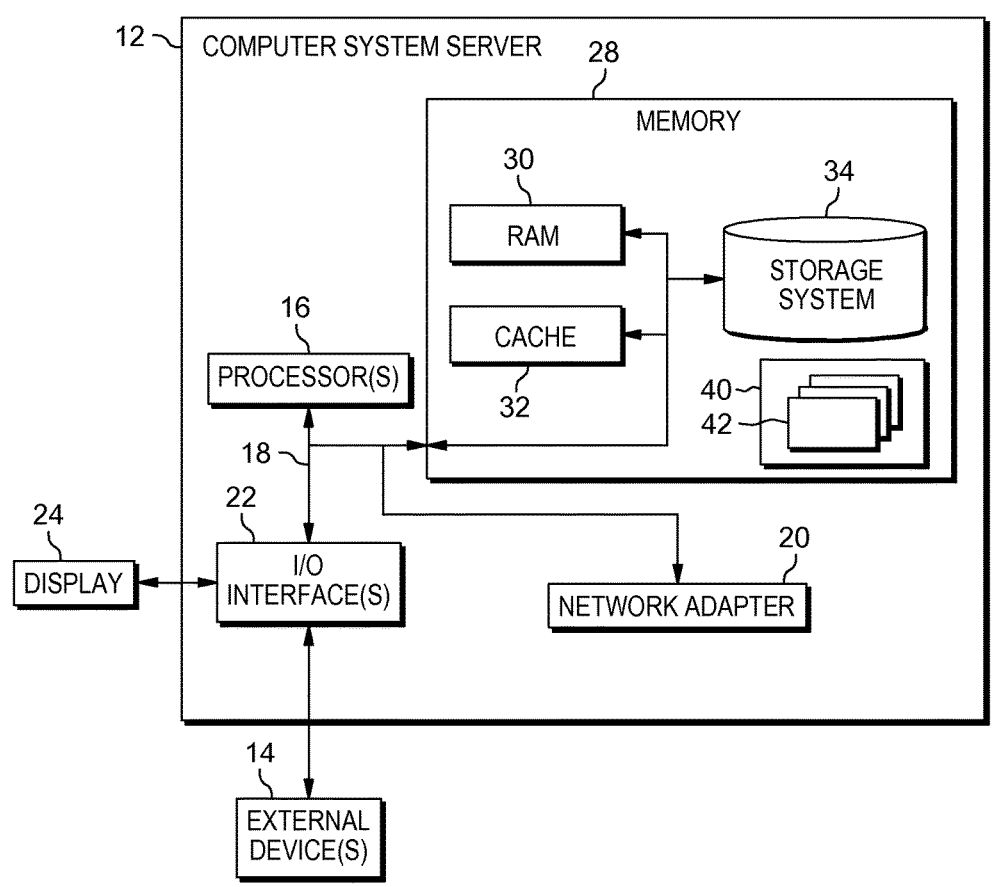
FIG. 1 shows a block diagram of an exemplary computer system/server 12 which is applicable to implement the embodiments of the present invention.

FIG. 1 shows a block diagram of an exemplary computer system/server 12 which is applicable to implement the embodiments of the present invention. The computer system/server 12 shown in FIG. 1 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing unit 16, a system memory 28, and a bus 18 that couples various system components including the system memory 28 and the processing unit 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from and writing to a removable, non-volatile optical disk such as a CD-ROM, DVD-ROM or other optical media can be provided. In such instances, each can be connected to the bus 18 by one or more data media interfaces. The memory 28 may include at least one program product having a set (e.g., at least one) of program modules that are configured to carry out the functions of embodiments of the invention.

The program/utility 40, having a set (at least one) of program modules 42, may be stored in the memory 28 by way of example. Such program modules 42 includes, but not limitation, an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc., one or more devices that enable a user to interact with computer system/server 12, and/or any devices (e.g., a network card, a modem, etc.) that enable computer system/server 12 to communicate with one or more other computing devices. Such communication can occur via an Input/Output (I/O) interfaces 22. Still yet, the computer system/server 12 can communicate with one or more networks such as a local area network (LAN), a general wide area network (WAN), and/or a public network (e.g., the Internet) via network adapter 20. As depicted, the network adapter 20 communicates with the other modules of the computer system/server 12 via the bus 18. It should be understood that although not shown, other hardware and/or software modules could be used in conjunction with the computer system/server 12. Examples include, but are not limited to: microcode, device drivers, redundant processing units, external disk drive arrays, RAID systems, tape drives, and data archival storage systems, etc.

As is known in the art, in order to reduce the burden of an egress RBridge, a portion of its job is transferred to the penultimate hop RBridge on a forwarding path, but this will cause that when receiving each data packet, each RBridge undergoes a lengthy procedure re-deciding whether the penultimate hop RBridge of the forwarding path is itself, which affects the forwarding efficiency. Embodiments of the present invention consider that when each RBridge establishes the forwarding path, that is to say when establishing its own routing information, whether the forward RBridge is the penultimate hop on each forwarding path is recorded and stored in the routing information, so that when each data packet is received, it can be determined directly whether the forwarding RBridge is the penultimate hop RBridge on the data packet forwarding path without a complicated decision procedure, thereby improving the forwarding efficiency of the data packet.

Those skilled in the art can know that the routing information can be stored in any form of data format. In one embodiment, the routing information is a row of data in the NFIB table of the forwarding RBridge, and a flag in the routing information row of the NFIB table is used to indicate whether the forwarding RBridge is the penultimate hop RBridge on the forwarding path to which the egress RBridge nickname is corresponding. In embodiments of the present invention, the routing information are stated in the form of the NFIB table, but those skilled in the art can know that it is not intended to limit the routing information format.

A piece of routing information of the NRIB table or the NFIB table corresponds to a forwarding path of which the destination address is the egress RBridge nickname, and there is a neighbor relationship between the egress RBridge and the penultimate hop RBridge on the path. Therefore, once the egress RBridge determines their neighbor relationship with its own neighbor RBridge on the same link, the neighbor RBridge can check its own NRIB table or NFIB table. For each piece of routing information, the flag as to whether the neighbor RBridge is the penultimate hop on the forwarding path to which the routing information is corresponding is added, so that an improved NRIB table can be obtained as shown in Table 7. A structure of an improved NFIB table is the same as Table 7. The column of "being the penultimate hop on the forwarding path or not" can be any column in Table 7. For example, if the column is 1, then it indicates that the RBridge where the NRIB table is located is the penultimate hop on the forwarding path to which the piece of routing information is corresponding; and if the row is 0, then it indicates that the RBridge where the NRIB table is located is not the penultimate hop on the forwarding path to which the piece of routing information is corresponding. In various embodiments, other flags also can be used to mark the above information.

TABLE 7

Improved structure of NRIB table

| Egress RBridge Nickname | Being the Penultimate Hop on the Forwarding Path or Not | Out port of TRILL Data packet | MAC Address for the Next Hop |
|---|---|---|---|

In one embodiment, each RBridge can make itself act as the ultimate hop on the forwarding path, i.e. the egress RBridge, and transmit a penultimate hop RBridge termination (PHRT) message to the neighbor RBridge in the form of multicast, the PHRT message indicating that the neighbor RBridge is the penultimate hop RBridge on the forwarding path in which the egress RBridge is the forwarding RBridge. The PHRT message can carry a Hello message found in the IS-IS neighbor in the form of triple TLV (Type-Length-Value, the T field representing a message type, the L field representing a message length, and the V field storing the content of the message usually). An IS-IS Hello message comprises a system identifier (ID) of the router and an area identifier in all areas, is transmitted to all IS-IS RBridges on a local area network (LAN) in the form of multicast, and begins listening all end system Hello (ESH) packets, intermediate system Hello (ISH) packets and IS-IS Hello packets, thereby finding all network nodes on the link. The PHRT message can also use other message formats of the existing TRILL network, even those skilled in the art can define separate message to propagate the above PHRT message, unnecessary details being omitted.

In addition, each RBridge comprises processing steps when acting as the penultimate hop on the forwarding path itself, that is the improved NFIB table as shown in Table 7 can be obtained by using the following steps: (1) receiving a PHRT message transmitted by a neighbor RBridge to the forwarding RBridge in the form of multicast, the PHRT message indicating the forwarding RBridge is the penultimate hop RBridge on the forwarding path in which the neighbor RBridge is the egress RBridge; (2) according to the received PHRT message, adding a flag as to whether or not the forwarding RBridge is the penultimate hop RBridge on the forwarding path to which the egress RBridge nickname in the routing information is corresponding into each piece of routing information in the NRIB table of the forwarding RBridge; (3) acquiring an NFIB table according to the NRIB table into which the flag is added, wherein each piece of the routing formation of the NFIB table comprises the flag as to whether or not the forwarding RBridge is the penultimate hop RBridge on the forwarding path to which the routing information is corresponding.

Figure 2:
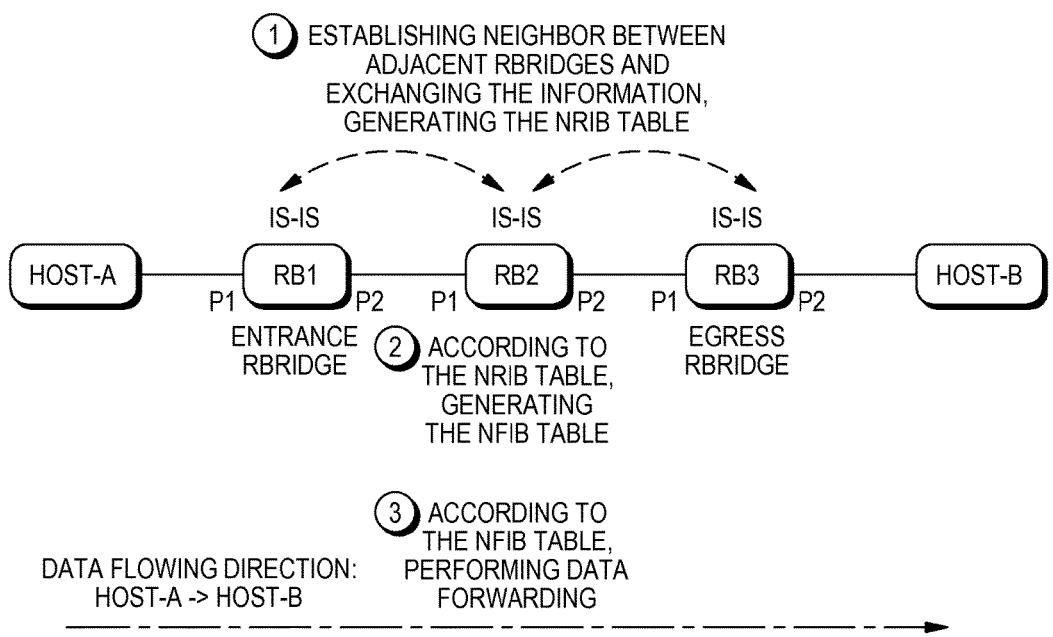
FIG. 2 shows a schematic structure of a TRILL network.

For example, the initial structure of the NRIB table which is generated with respect to RB2 shown in FIG. 2 is shown in Table 8. In the initial situation, the column of "Being the Penultimate Hop on the Forwarding Path or not" is all filled with 0, indicating not the penultimate Hop on the forwarding path.

TABLE 8 improved initial structure of NRIB table of RB2

| Egress RBridge Nickname | Being Penultimate Hop on the Forwarding Path or Not | Out port of TRILL Data packet | MAC Address for the Next Hop |
|---|---|---|---|
| RB1 | 0 | P1 | RB1 |
| RB3 | 0 | P2 | RB3 |

The RB1 and RB3 in FIG. 2 transmit a PHRT notification message to the RB2 through an IS-IS Hello. Table 9 shows a message format of part content of the PHRT notification message transmitted by the RB1 and RB3.

TABLE 9 schematic message format of PHRT notification message

| DMAC(IS-IS) | SMAC | ... | Type(Noti) | Length | Value |
|---|---|---|---|---|---|

In Table 9, DMAC represents a destination MAC address, wherein a multicast address of the IS-IS protocol is adopted; SMAC represents a source MAC address, wherein it refers to the RBridge MAC address transmitting the PHRT message; Type represents the type of the transmitted PHRT message, Noti is a notification message (Notification), ACK is an acknowledge message (Acknowledge), and Fin is a connection pausing message (Finish); Length represents the length of the message; and Value represents the message content.

After the RB2 receives the PHRT notification message from the RB1 and RB3, the information is stored in a PHRT table as shown in Table 10.

TABLE 10

PHRT table of RB2

| Nickname of RBridge | Port Number Receiving PHRT Message | RBridge MAC Address Transmitting PHRT Message |
|---|---|---|
| RB1 | P1 | RB1 |
| RB3 | P2 | RB3 |

Then, on the RB2, the flag as to whether the routing entry to which the destination RBridge nickname RB1 and RB3 in the NRIB table is corresponding is the penultimate hop on the forwarding path is set to 1, and the NRIB table of RB2 as shown in Table 11 is obtained. Subsequently, the NFIB table of the RB2 as shown in Table 12 is extracted from the NRIB table by using Table 11 and the prior art, and the extracted NFIB table comprises the flag.

TABLE 11

NRIB table of RB2

| Egress RBridge Nickname | being the penultimate hop on the forwarding path or not | Out port of TRILL Data packet | MAC Address for the Next Hop |
|---|---|---|---|
| RB1 | 1 | P1 | RB1 |
| RB3 | 1 | P2 | RB3 |

TABLE 12

NFIB table of RB2

| Egress RBridge Nickname | being the penultimate hop on the forwarding path or not | Out port of TRILL Data packet | MAC Address for the Next Hop |
|---|---|---|---|
| RB1 | 1 | P1 | RB1 |
| RB3 | 1 | P2 | RB3 |

In the above embodiment, since the NRIB table comprises many pieces of routing information, each piece confirms that the forwarding RBridge is the penultimate hop RBridge on the forwarding path in which the egress RBridge in the piece of routing information is the neighbor RBridge according to the received PHRT message. In another embodiment, the NFIB table can be used directly, of which the method comprises the following steps: (1) receiving a PHRT message transmitted by a neighbor RBridge to the forwarding RBridge in the form of multicast, the PHRT message indicating the forwarding RBridge is the penultimate hop RBridge on the forwarding path in which the neighbor RBridge is the egress RBridge, for example, after the RB2 in FIG. 2 receives the PHRT notification message from the RB1 and RB3, the information is stored in PHRT table as shown in Table 10; (2) according to the received PHRT message, adding a flag as to whether or not the forwarding RBridge is the penultimate hop RBridge on the forwarding path to which the egress RBridge nickname in the routing information is corresponding into each piece of routing information in the NFIB table of the forwarding RBridge. The specific implementing manner is similar to the passive marking manner of the NRIB table, unnecessary details being omitted. For example, on the RB2, the PHRT flag of the entry to which the nickname RB1 and RB3 in the NFIB table is corresponding is set to 1, and the NFIB table of RB2 as shown in Table 12 is obtained.

The above embodiment depends on the notification of the neighbor RBridge, which can be regarded as a passive marking method. The present invention also discloses two active marking methods.

In one active marking embodiment, the steps comprising: (1) acquiring all neighbor RBridge nicknames of the forwarding RBridge, for example, the neighbor RBridge nicknames of the RB2 shown in FIG. 2 being RB1 and RB3; (2) checking each piece of the routing information of the NRIB table of the forwarding RBridge, wherein, in one piece routing information, according to whether or not the egress RBridge nickname of the routing information is the same as any neighbor RBridge nickname, adding a flag as to whether or not the forwarding RBridge is the penultimate hop RBridge on the forwarding path to which the egress RBridge nickname is corresponding into the routing information, for example, comparing each piece of routing information in Table 8, and obtaining each piece of routing information shown in Table 11; and (3) acquiring an NFIB table according to the NRIB table into which the flag is added, wherein each piece of the routing formation of the NFIB table comprises the flag as to whether or not the forwarding RBridge is the penultimate hop RBridge on the forwarding path to which the routing information is corresponding, in which the NFIB table is extracted from the NRIB table by using the prior art, and the extracted NFIB table comprises the flag, for example, obtaining Table 12 from Table 11.

In another active marking embodiment, the steps comprising: (1) acquiring all neighbor RBridge nicknames of the forwarding RBridge, for example, the neighbor RBridge nicknames of the RB2 shown in FIG. 2 being RB1 and RB3; and (2) checking each piece of the routing information of the NRIB table of the forwarding RBridge, wherein, in one piece routing information, according to whether or not the egress RBridge nickname of the routing information is the same as any neighbor RBridge nickname, adding a flag as to whether or not the forwarding RBridge is the penultimate hop RBridge on the forwarding path to which the egress RBridge nickname is corresponding into the routing information. The specific implementing manner is similar to the active marking manner of the NRIB table, unnecessary details being omitted. For example, each piece of routing information in Table 8 is compared, and each piece of routing information shown in Table 12 is obtained.

Table 2 can be established with the aforesaid embodiments, but it also can be established by other devices and then transferred to the current RBridge, or an established NFIB table can be actively acquired over a network by the current RBridge, and the like. In the process of specific data forwarding, the NFIB table as shown in Table 7 already exists in the current RBridge.

Figure 3:
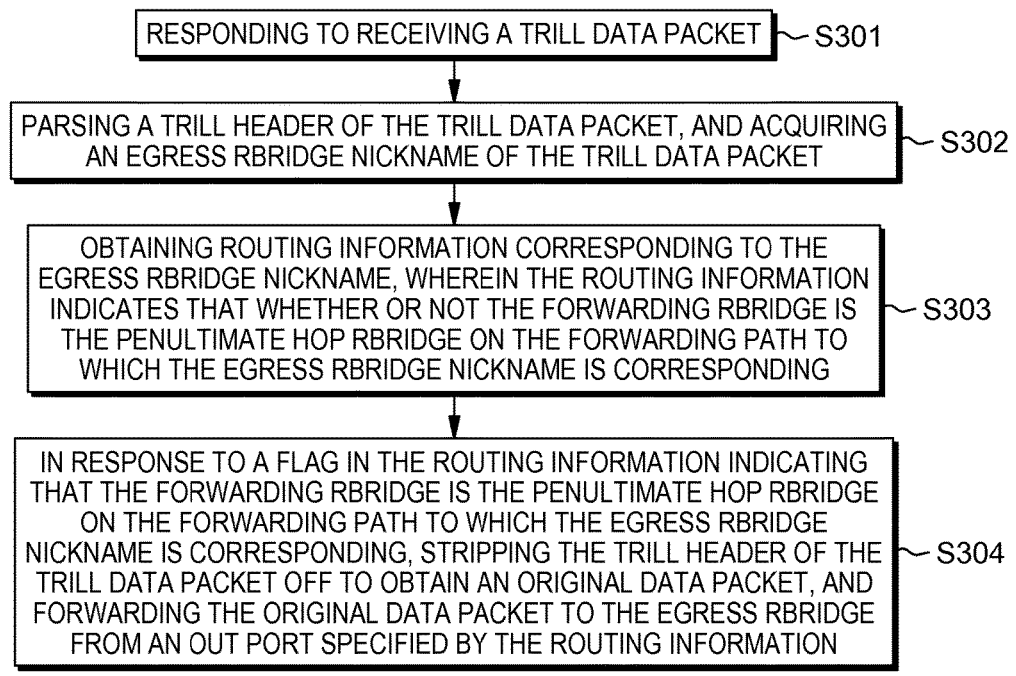
FIG. 3 schematically shows a flowchart of a method for routing and forwarding a data packet with a forwarding RBridge.

Next, let's return to the forwarding procedure of a TRILL data packet. With respect to the RBridge receiving an original data packet, for example, the RB1 as shown in FIG. 2, the present invention can forward it by using known methods in the art. In one embodiment of the present invention, a method for routing and forwarding a data packet with an RBridge is disclosed. FIG. 3 schematically shows a flowchart of a method for routing and forwarding a data packet with a forwarding RBridge. According to FIG. 3, the method comprising: in step S301, in response to receiving a TRILL data packet, performing the following steps: in step S302, parsing a TRILL header of the TRILL data packet, and acquiring an egress RBridge nickname of the TRILL data packet; in step S303, obtaining the routing information corresponding to the egress RBridge nickname, wherein the routing information comprises a flag indicating whether or not the forwarding RBridge is the penultimate hop RBridge on the forwarding path to which the egress RBridge nickname is corresponding; and in step S304, in response to the flag indication in the routing information that the forwarding RBridge is the penultimate hop RBridge on the forwarding path to which the egress RBridge nickname is corresponding, stripping the TRILL header of the TRILL data packet off to obtain an original data packet, and forwarding the original data packet to the egress RBridge from an out port specified by the routing information.

In the NFIB table used by the aforesaid step S303, the improved structure of the NFIB table shown by Table 7 can be adopted. For example, when the RB2 receives a TRILL data packet transmitted by the RB1, it is decided that the TRILL data packet is the penultimate hop on the forwarding path, a TRILL header of the TRILL data packet is stripped off so as to obtain the original data packet, and the original data packet is transmitted to the RB3. Since the flag directly points out whether or not the forwarding RBridge is the penultimate hop RBridge on the forwarding path to which the egress RBridge nickname is corresponding, the forwarding procedure does not need a complicated decision procedure, and directly uses this information, which can improve the forwarding efficiency. Additionally, transferring a part of job of the ultimate hop RBridge on the forwarding path, i.e. the egress RBridge, to the penultimate hop RBridge can reduce the burden of the boundary RBridge.

In one embodiment, the method shown in FIG. 3 further comprises step S304: in response to the indication in the routing information that the forwarding RBridge is not the penultimate hop RBridge on the forwarding path to which the egress RBridge nickname is corresponding, obtaining an out port and the next hop RBridge specified by the routing information from the routing information, and forwarding the TRILL data packet to the next hop RBridge from the out port specified by the routing information. The implementing manner of the step is similar to that of the prior art, unnecessary details being omitted.

After confirming the penultimate hop RBridge, the processed message is to be transmitted to the ultimate hop RBridge, so in one embodiment, the method shown in FIG. 3 further comprises an additional step: in response to receiving the original data packet and confirming that the forwarding RBridge is the ultimate hop RBridge on the forwarding path to which the egress RBridge nickname is corresponding, performing the following steps: obtaining a destination MAC address from the original data packet; acquiring an out port corresponding to the destination MAC address in an FDB table by using the destination MAC address; and transmitting the original data packet to the destination MAC address through the corresponding out port. Comparing the implementing manner of the step with that of the prior art, the processing procedure when the ultimate hop RBridge performs routing is reduced, and the prior art already discloses how to implement the reserved processing procedure, unnecessary details being omitted.

The RBridge in the TRILL network may be the RB1, the RB2, or the RB3 in FIG. 2, so the processing procedure of routing for one RBridge should comprise the processing procedure of each of the aforesaid RBridges.

Figure 4:
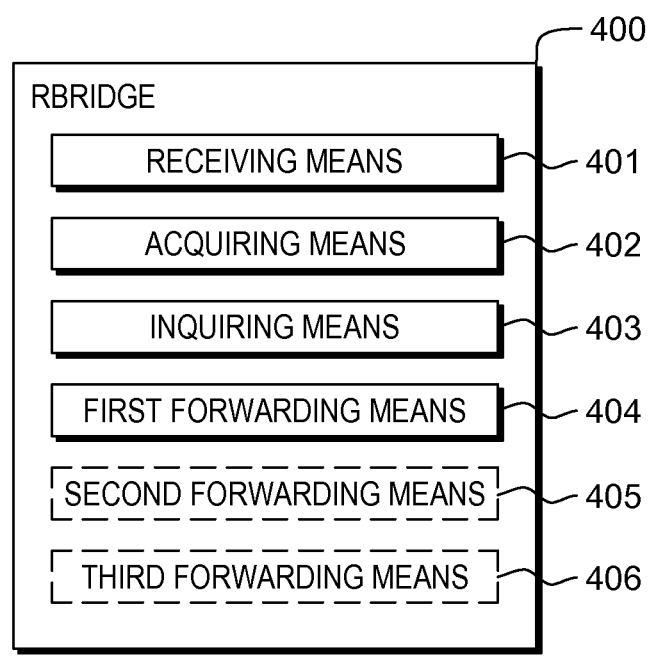
FIG. 4 shows a structure block diagram of a forwarding RBridge for routing and forwarding a data packet.

In the same invention concept, the present invention also discloses a forwarding RBridge for routing and forwarding a data packet. FIG. 4 schematically shows a structure block diagram of a forwarding RBridge 400 for routing and forwarding a data packet. According to FIG. 4, the forwarding RBridge comprises: a receiving means 401 configured to receive a TRILL data packet; an acquiring means 402 configured to, in response to the TRILL data packet received by the receiving means, parse a TRILL header of the received TRILL data packet and acquire an egress RBridge nickname of the TRILL data packet; an inquiring means 403 configured to obtain the routing information corresponding to the egress RBridge nickname, wherein the routing information indicates whether or not the forwarding RBridge is the penultimate hop RBridge on the forwarding path to which the egress RBridge nickname is corresponding; and a first forwarding means 404 configured to, in response to the indication in the routing information that the forwarding RBridge is the penultimate hop RBridge on the forwarding path to which the egress RBridge nickname is corresponding, strip the TRILL header of the TRILL data packet off to obtain an original data packet, and forward the original data packet to the egress RBridge from an out port specified by the routing information.

In one embodiment, the forwarding RBridge further comprises a second forwarding means 405 configured to, in response to the indication in the routing information that the forwarding RBridge is not the penultimate hop RBridge on the forwarding path to which the egress RBridge nickname is corresponding, obtain an out port and the next hop RBridge specified by the routing information from the routing information, and forward the TRILL data packet to the next hop RBridge from the out port specified by the routing information.

In one embodiment, the receiving means is further configured to receive the original data packet, and the forwarding RBridge further comprises a third forwarding means 406 configured to, in response to the receiving means receiving the original data packet and confirming that the forwarding RBridge is the ultimate hop RBridge on the forwarding path to which the egress RBridge nickname is corresponding, perform the following steps: obtaining a destination MAC address from the original data packet; acquiring an out port corresponding to the destination MAC address in an FDB table by using the destination MAC address; and transmitting the original data packet to the destination MAC address through the corresponding out port.

In one embodiment, the routing information is a row of data in the NFIB table, and the flag in the routing information row of the NFIB table is used to indicate whether or not the forwarding RBridge is the penultimate hop RBridge on the forwarding path to which the egress RBridge nickname is corresponding.

In one embodiment, the forwarding RBridge further comprises (not shown in FIG. 4): a PHRT message receiving means configured to receive the PHRT message transmitted to the forwarding RBridge by the neighbor RBridge in the form of multicast, the PHRT message indicating that the forward RBridge is the penultimate hop RBridge on the forwarding path in which the neighbor RBridge is the egress RBridge; a first marking means configured to, according to the received PHRT message, add a flag as to whether or not the forwarding RBridge is the penultimate hop RBridge on the forwarding path to which the egress RBridge nickname in the routing information is corresponding into each piece of routing information in the NRIB table of the forwarding RBridge; and a second marking means configured to obtain an NFIB table according to the NRIB table into which the flag is added, wherein each piece of the routing formation of the NFIB table comprises the flag as to whether or not the forwarding RBridge is the penultimate hop RBridge on the forwarding path to which the routing information is corresponding.

In one embodiment, the forwarding RBridge further comprises (not shown in FIG. 4): a PHRT message receiving means configured to receive the PHRT message transmitted to the forwarding RBridge by the neighbor RBridge in the form of multicast, the PHRT message indicating that the forward RBridge is the penultimate hop RBridge on the forwarding path in which the neighbor RBridge is the egress RBridge; a third marking means configured to, according to the received PHRT message, add a flag as to whether or not the forwarding RBridge is the penultimate hop RBridge on the forwarding path to which the egress RBridge nickname in the routing information is corresponding into each piece of routing information in the NFIB table of the forwarding RBridge.

In one embodiment, the forwarding RBridge further comprises (not shown in FIG. 4): a PHRT message transmitting means configured to transmit the PHRT message to the neighbor RBridge in the form of multicast, the PHRT message indicating that the neighbor RBridge is the penultimate hop RBridge on the forwarding path in which the egress RBridge is the forwarding RBridge.

In one embodiment, the forwarding RBridge further comprises (not shown in FIG. 4): a neighbor obtaining means configured to obtain all neighbor RBridge nicknames of the forwarding RBridge; a fourth marking means configured to check each piece of the routing information of the NRIB table of the forwarding RBridge, wherein, in one piece routing information, according to whether or not the egress RBridge nickname of the routing information is the same as any neighbor RBridge nickname, a flag as to whether or not the forwarding RBridge is the penultimate hop RBridge on the forwarding path to which the egress RBridge nickname is corresponding is added into the routing information; and a fifth marking means configured to obtain an NFIB table according to the NRIB table into which the flag is added, wherein each piece of the routing formation of the NFIB table comprises the flag as to whether or not the forwarding RBridge is the penultimate hop RBridge on the forwarding path to which the routing information is corresponding.

In one embodiment, the forwarding RBridge further comprises (not shown in FIG. 4): a neighbor obtaining means configured to obtain all neighbor RBridge nicknames of the forwarding RBridge; a sixth marking means configured to check each piece of the routing information of the NFIB table of the forwarding RBridge, wherein, in one piece routing information, according to whether or not the egress RBridge nickname of the routing information is the same as any neighbor RBridge nickname, a flag as to whether or not the forwarding RBridge is the penultimate hop RBridge on the forwarding path to which the egress RBridge nickname is corresponding is added into the routing information.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can remain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the aforesaid. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the aforesaid. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing the state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for routing and forwarding a data packet with forwarding routing bridge (RBridge), comprising:
   in response to receiving a transparent interconnection of lots of links (TRILL) data packet, performing the following steps:
   parsing a TRILL header of the TRILL data packet, and acquiring an egress RBridge nickname of the TRILL data packet;
   obtaining routing information corresponding to the egress RBridge nickname, wherein the routing information indicates whether or not the forwarding RBridge is a penultimate hop RBridge on a forwarding path to which the egress RBridge nickname is corresponding, and wherein the forwarding RBridge is recorded and stored in the routing information; and
   in response to the indication recorded and stored in the routing information that the forwarding RBridge is the penultimate hop RBridge on the forwarding path to which the egress RBridge nickname is corresponding, directly routing the RBridge on the data packet forwarding path, stripping the TRILL header of the TRILL data packet off to obtain an original data packet, and forwarding the original data packet to the egress RBridge from an out port specified by the routing information, wherein the routing information is a row of data in a nickname forwarding information base (NFIB) table, and a flag in a routing information row of the NFIB table is used to indicate whether or not the forwarding RBridge is the penultimate hop RBridge on the forwarding path to which the egress RBridge nickname is corresponding.

2. The method according to claim 1, further comprising:
   in response to receiving a second TRILL data packet, performing the following steps:
   parsing a TRILL header of the second TRILL data packet, and acquiring an egress RBridge nickname of the second TRILL data packet;
   obtaining second routing information corresponding to the egress RBridge nickname of the second TRILL data packet, wherein the second routing information indicates whether or not the forwarding RBridge of the second TRILL data packet is a penultimate hop RBridge on a forwarding path to which the egress RBridge nickname of the second TRILL data packet is corresponding, and wherein the forwarding RBridge is recorded and stored in the second routing information; and
   in response to the indication recorded and stored in the second routing information that the forwarding RBridge of the second TRILL data packet is not the penultimate hop RBridge on the forwarding path to which the egress RBridge nickname of the second TRILL data packet is corresponding, obtaining an out port and a second hop RBridge specified by the second routing information from the second routing information, and forwarding the second TRILL data packet to the second hop RBridge from the out port specified by the second routing information.

3. The method according to claim 1, further comprising:
   in response to receiving the original data packet and confirming that the forwarding RBridge is an ultimate hop RBridge on the forwarding path to which the egress RBridge nickname is corresponding, performing the following steps:
   obtaining a destination address from the original data packet;
   acquiring an out port corresponding to the destination address in a forwarding database table by using the destination address; and
   transmitting the original data packet to the destination address through the corresponding out port.

4. The method according to claim 1, wherein the flag is obtained by: receiving a penultimate hop RBridge termination (PHRT) message transmitted to the forwarding RBridge by a neighbor RBridge in a form of multicast, the PHRT message indicating that the forwarding RBridge is the penultimate hop RBridge on the forwarding path in which the neighbor RBridge is the egress RBridge; based on the received PHRT message, adding a flag as to whether or not the forwarding RBridge is the penultimate hop RBridge on the forwarding path to which the egress RBridge nickname in the routing information is corresponding into each piece of routing information in a nickname routing NRIB table of the forwarding RBridge; and obtaining the NFIB table according to the NRIB table into which the flag is added, wherein each piece of the routing information of the NFIB table comprises the flag as to whether or not the forwarding RBridge is the penultimate hop RBridge on the forwarding path to which the routing information is corresponding.

5. The method according to claim 1, wherein the flag is obtained by:
   receiving a PHRT message transmitted to the forwarding RBridge by a neighbor RBridge in a form of multicast, the PHRT message indicating that the forwarding RBridge is the penultimate hop RBridge on the forwarding path in which the neighbor RBridge is the egress RBridge; and
   according to the received PHRT message, adding the flag as to whether or not the forwarding RBridge is the penultimate hop RBridge on the forwarding path to which the egress RBridge nickname in the routing information is corresponding into each piece of routing information in the NFIB table of the forwarding RBridge.

6. The method according to claim 1, the method further comprising:
transmitting the PHRT message to the neighbor RBridge in the form of multicast, the PHRT message indicating that the neighbor RBridge is the penultimate hop RBridge on the forwarding path in which the egress RBridge is the forwarding RBridge.

7. The method according to claim 1, wherein the flag is obtained by:
obtaining each neighbor RBridge nickname of the forwarding RBridge;
checking each piece of the routing information of a NRIB table of the forwarding RBridge, wherein, in one piece routing information, according to whether or not the egress RBridge nickname of the routing information is the same as any neighbor RBridge nickname, a flag as to whether or not the forwarding RBridge is the penultimate hop RBridge on the forwarding path to which the egress RBridge nickname is corresponding is added into the routing information; and
obtaining an NFIB table according to the NRIB table into which the flag is added, wherein each piece of the routing information of the NFIB table comprises the flag as to whether or not the forwarding RBridge is the penultimate hop RBridge on the forwarding path to which the routing information is corresponding.

8. The method according to claim 1, wherein the flag is obtained by:
obtaining each neighbor RBridge nickname of the forwarding RBridge; and
checking each piece of the routing information of the NFIB table of the forwarding RBridge, wherein, in one piece routing information, according to whether the egress RBridge nickname of the routing information is the same as any neighbor RBridge nickname, a flag as to whether the forwarding RBridge is the penultimate hop RBridge on the forwarding path to which the egress RBridge nickname is corresponding is added into the routing information.

9. A system for routing and forwarding a data packet with forwarding routing bridge (RBridge), the system comprising:
one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
in response to receiving a transparent interconnection of lots of links (TRILL) data packet, performing the following computer program instructions:
program instructions to parse a TRILL header of the TRILL data packet, and acquiring an egress RBridge nickname of the TRILL data packet;
program instructions to obtain routing information corresponding to the egress RBridge nickname, wherein the routing information indicates whether or not the forwarding RBridge is a penultimate hop RBridge on a forwarding path to which the egress RBridge nickname is corresponding, and wherein the forwarding RBridge is recorded and stored in the routing information; and
in response to the indication recorded and stored in the second routing information that the forwarding RBridge of the second TRILL data packet is not the penultimate hop RBridge on the forwarding path to which the egress RBridge nickname of the second TRILL data packet is corresponding, program instructions to obtain an out port and a second hop RBridge specified by the second routing information from the second routing information, and forwarding the second TRILL data packet to the second hop RBridge from the out port specified by the second routing information, wherein the routing information is a row of data in a nickname forwarding information base (NFIB) table, and a flag in a routing information row of the NFIB table is used to indicate whether or not the forwarding RBridge is the penultimate hop RBridge on the forwarding path to which the egress RBridge nickname is corresponding.

10. The system according to claim 9, the program instructions further comprising:
in response to receiving a second TRILL data packet, perform the following steps:
program instructions to parse a TRILL header of the second TRILL data packet, and acquire an egress RBridge nickname of the second TRILL data packet;
program instructions to obtain a second routing information corresponding to the egress RBridge nickname of the second TRILL data packet, wherein the second routing information indicates whether or not the forwarding RBridge of the second TRILL data packet is a penultimate hop RBridge on a forwarding path to which the egress RBridge nickname of the second TRILL data packet is corresponding, and wherein the forwarding RBridge is recorded and stored in the second routing information; and
program instructions to obtain an out port and a second hop RBridge specified by the routing information from the second routing information, and forward the second TRILL data packet to the second hop RBridge from the out port specified by the second routing information, in response to the indication recorded and stored in the second routing information that the forwarding RBridge of the second TRILL data packet is not the penultimate hop RBridge on the forwarding path to which the egress RBridge nickname of the second TRILL data packet is corresponding.

11. The system according to claim 9, the program instructions further comprising:
program instructions to, in response to receiving the original data packet and confirming that the forwarding RBridge is an ultimate hop RBridge on the forwarding path to which the egress RBridge nickname is corresponding, perform the following computer program instructions:
program instructions to obtain a destination address from the original data packet;
program instructions to acquire an out port corresponding to the destination address in a forwarding database (FDB) table by using the destination address; and
program instructions to transmit the original data packet to the destination address through the corresponding out port.

12. The system according to claim 9, wherein the flag is obtained by executing the following program instructions:
program instructions to receive a penultimate hop RBridge termination (PHRT) message transmitted to the forwarding RBridge by a neighbor RBridge in a form of multicast, the PHRT message indicating that the forwarding RBridge is the penultimate hop RBridge on the forwarding path in which the neighbor RBridge is the egress RBridge; program instructions to add a flag as to whether or not the forwarding RBridge is the penultimate hop RBridge on the forwarding path to which the egress RBridge nickname in the routing information is corresponding into each piece of routing information in a nickname routing NRIB table of the forwarding RBridge based on the received PHRT message; and program instructions to obtain the NFIB table according to the NRIB table into which the flag is added, wherein each piece of the routing information of the NFIB table comprises the flag as to whether or not the forwarding RBridge is the penultimate hop RBridge on the forwarding path to which the routing information is corresponding.

13. The system according to claim 9, wherein the flag is obtained by executing the following program instructions: program instructions to receive a PHRT message transmitted to the forwarding RBridge by a neighbor RBridge in a form of multicast, the PHRT message indicating that the forwarding RBridge is the penultimate hop RBridge on the forwarding path in which the neighbor RBridge is the egress RBridge; and program instructions to, according to the received PHRT message, add a flag as to whether or not the forwarding RBridge is the penultimate hop RBridge on the forwarding path to which the egress RBridge nickname in the routing information is corresponding into each piece of routing information in the NFIB table of the forwarding RBridge.

14. The system according to claim 12, the program instructions further comprising:
program instructions to transmit the PHRT message to the neighbor RBridge in the form of multicast, the PHRT message indicating that the neighbor RBridge is the penultimate hop RBridge on the forwarding path in which the egress RBridge is the forwarding RBridge.

15. A computer program product for routing and forwarding a data packet with forwarding routing bridge (RBridge), the computer program product comprising:
one or more computer-readable tangible storage devices and program instructions stored on at least one of the one or more computer-readable tangible storage devices, the program instructions comprising:
in response to receiving a transparent interconnection of lots of links (TRILL) data packet, performing the following computer program instructions:
program instructions to parse a TRILL header of the TRILL data packet, and acquiring an egress RBridge nickname of the TRILL data packet;
program instructions to obtain routing information corresponding to the egress RBridge nickname, wherein the routing information indicates whether or not the forwarding RBridge is a penultimate hop RBridge on a forwarding path to which the egress RBridge nickname is corresponding, and wherein the forwarding RBridge is recorded and stored in the routing information; and
in response to the indication recorded and stored in the second routing information that the forwarding RBridge of the second TRILL data packet is not the penultimate hop RBridge on the forwarding path to which the egress RBridge nickname of the second TRILL data packet is corresponding, program instructions to obtain an out port and a second hop RBridge specified by the second routing information from the second routing information, and forwarding the second TRILL data packet to the second hop RBridge from the out port specified by the second routing information, wherein the routing information is a row of data in a nickname forwarding information base (NFIB) table, and a flag in a routing information row of the NFIB table is used to indicate whether or not the forwarding RBridge is the penultimate hop RBridge on the forwarding path to which the egress RBridge nickname is corresponding.

16. The computer program product according to claim 15, the program instructions further comprising:
program instructions to, in response to receiving a second TRILL data packet, perform the following steps:
program instructions to parse a TRILL header of the second TRILL data packet, and acquire an egress RBridge nickname of the second TRILL data packet;
program instructions to obtain a second routing information corresponding to the egress RBridge nickname of the second TRILL data packet, wherein the second routing information indicates whether or not the forwarding RBridge of the second TRILL data packet is a penultimate hop RBridge on a forwarding path to which the egress RBridge nickname of the second TRILL data packet is corresponding, and wherein the forwarding RBridge is recorded and stored in the second routing information; and
program instructions to obtain an out port and a second hop RBridge specified by the routing information from the second routing information, and forward the second TRILL data packet to the second hop RBridge from the out port specified by the second routing information, in response to the indication recorded and stored in the second routing information that the forwarding RBridge of the second TRILL data packet is not the penultimate hop RBridge on the forwarding path to which the egress RBridge nickname of the second TRILL data packet is corresponding.

* * * * *